(12) United States Patent
Richard

(10) Patent No.: US 6,311,817 B1
(45) Date of Patent: Nov. 6, 2001

(54) PROTECTOR DEVICE FOR A MACHINE

(75) Inventor: Jacques Richard, Valeyres sous Rances (CH)

(73) Assignee: Nestec SA, Vevey (CH)

( * ) Notice: Subject to any disclaimer, the term of this patent is extended or adjusted under 35 U.S.C. 154(b) by 0 days.

(21) Appl. No.: 09/519,592

(22) Filed: Mar. 6, 2000

(30) Foreign Application Priority Data

Mar. 23, 1999 (EP) .................................................. 99105822

(51) Int. Cl.⁷ .................................................... F16P 3/08
(52) U.S. Cl. ............................................. 192/135; 74/612
(58) Field of Search .................................... 192/133, 134, 192/135; 74/613, 608, 612, 616

(56) References Cited

U.S. PATENT DOCUMENTS

| | | |
|---|---|---|
| 3,902,582 | 9/1975 | Cross . |
| 3,912,061 * | 10/1975 | Foster .................................. 192/133 |
| 3,996,815 * | 12/1976 | Walker ............................. 192/134 X |
| 4,170,880 * | 10/1979 | Lou ......................................... 62/262 |
| 4,179,987 * | 12/1979 | Dohm ............................... 192/133 X |
| 4,307,798 * | 12/1981 | Watanabe .............................. 192/133 |

FOREIGN PATENT DOCUMENTS

| | | | |
|---|---|---|---|
| 196 15 588 | 10/1997 | (DE) . | |
| 0 363 810 | 4/1990 | (EP) . | |
| 2 245 474 | 4/1975 | (FR) . | |
| 638129 | 5/1950 | (GB) . | |
| 1 534 606 | 12/1978 | (GB) . | |
| 2 084 279 | 4/1982 | (GB) . | |
| 2 132 933 | 7/1984 | (GB) . | |
| 2 076 921 * | 12/1981 | (GB) | .................................... 192/133 |
| 2-30349 * | 1/1990 | (JP) | ..................................... 192/133 |

* cited by examiner

Primary Examiner—Rodney H. Bonck
(74) Attorney, Agent, or Firm—Young & Thompson

(57) ABSTRACT

A protector device for a danger zone of the machine includes two parallel slides 10 disposed along two sides of this danger zone and two normally open switches 11, 11a connected in series in the electrical supply of at least one motor of the machine. One of these switches is disposed adjacent one end of one of the slides 10 while the other 11a is disposed adjacent the opposite end of one of the slides 10. It also comprises a protector element 8 sliding in the slides and whose length is such that in service position, this protector element 8 actuates the control members of the two switches 11, 1a to close them.

18 Claims, 2 Drawing Sheets

PROTECTOR DEVICE FOR A MACHINE

FIELD OF THE INVENTION

The present invention relates to the safety of machines and more particularly the safety of the personnel monitoring and/or controlling these machines.

BACKGROUND OF THE INVENTION

There exist numerous machines having moving parts which can be dangerous for the person now working with the machines. Among such machines are for example presses, extruders, molding machines, grinders, which all have movable members adapted to cause accidents if people using these machines have the possibility to enter danger zones of these machines.

To avoid accidents, it has been proposed to provide protector elements, grills, panels or other members, displaceable from an inactive position in which access to the machine is permitted, to an active position in which certain zones of the machine are no longer accessible. An automatic device ensures that the supply of energy to the machine be interrupted as soon as the protector element is no longer active.

Such protector devices for machines are for example described in EP 0 363 810; GB 1 534 606; GB 2 084 279; GB 2 132 933 and U.S. Pat. No. 3,902,582.

In certain types of machines, for example granulators, the danger zone of the machine must be observed during observation of the latter, the protector elements must be transparent, or provided with grills. But during their operation, these machines throw particles against the protector elements, rendering them opaque. To clean these protector elements, it is necessary, with existing machines, to stop the machine and then to restart it only when the cleaned protector element is in place.

This leads to frequent stopping and substantial down time of the machine whose productivity is considerably lowered.

SUMMARY OF THE INVENTION

The present invention has for its object to ensure the security of people working with the machine whilst avoiding frequent stopping of the latter for cleaning the protector elements.

The present invention has for its object a protector device for a machine overcoming the mentioned drawbacks and permitting achieving the object stated above.

The protector device according to the invention is distinguished by the characteristics set forth in the claims of the present application.

BRIEF DESCRIPTION OF THE INVENTION

The accompanying drawings show schematically and by way of example a granulator for an extruder, provided with a protector device according to the invention.

Figure 1:
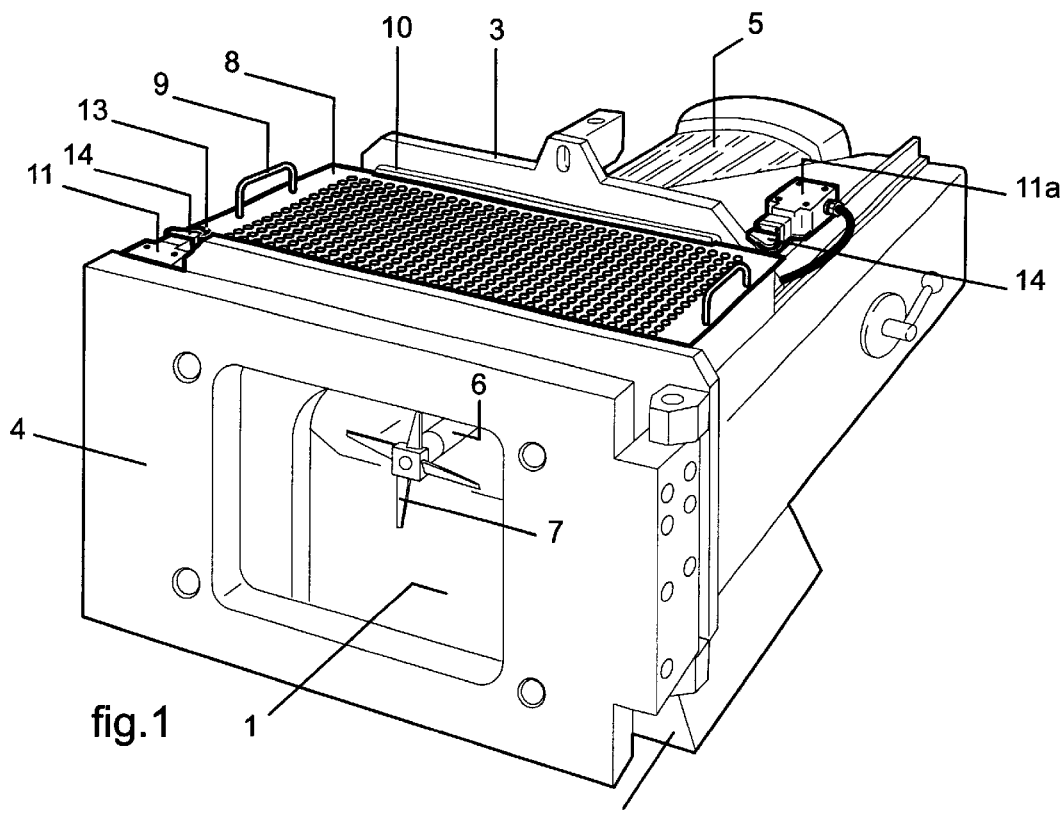
FIG. 1 is a perspective view of the granulator, the extruder being removed, provided with the protector device according to the invention in the normal operating position.

In the illustrated embodiment, the machine provided with the protective device according to the invention is a granulator comprising a granulation chamber 1 disposed within a housing 2 comprising on two opposite surfaces plates 3, 4. On one of these plates 3 is secured a motor 5 whose rotatable shaft 6 carries a knife 7 disposed in the granulation chamber 1. On the other plate 4 will be fixed an extruder (not shown) permitting extruding within the granulation chamber a sausage of extruded material which is sliced into small bits or granules by the knife 7.

The granulation chamber 1 is closed on three sides by the housing 2 and open on its upper portion. This upper opening is closed by a removable grill 8. This grill 8 comprises gripping handles 9 and slides, perpendicular to the axle 6 of the motor 5, in parallel slideways 10 secured to the housing 2. The grill 8 can thus be emplaced to close the upper opening of the granulation chamber by lateral sliding.

The protector device comprising the grill 8 and the slides 10 also comprises two normally open switches 11, 11a, whose control members are in this case formed by rollers 13 pivoted on an oscillating arm 14. The switches 11, 11a are mounted on the housing 2 such that the rollers 13 will each be disposed in prolongation of a slide 10 and located approximately on a diagonal of the opening of the granulation chamber 1.

Thus, when the protector grill 9 is in service position (FIG. 1) the two switches 11, 11a are closed, the rollers 13 being each pressed back by one side edge of the grill 8.

The positioning of the two switches 11, 11a relative to the opening of the housing 2 is such that when the two switches are actuated by the grill 8, the latter completely closes the opening.

Figure 5:
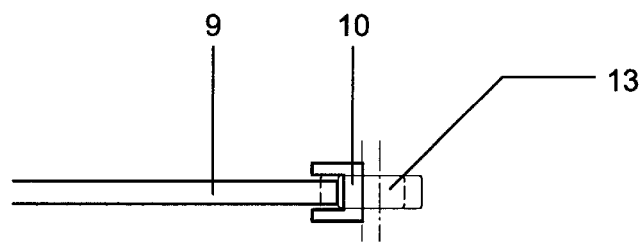
FIG. 5 is a detail of the protector device shown in elevation.
Figure 4:
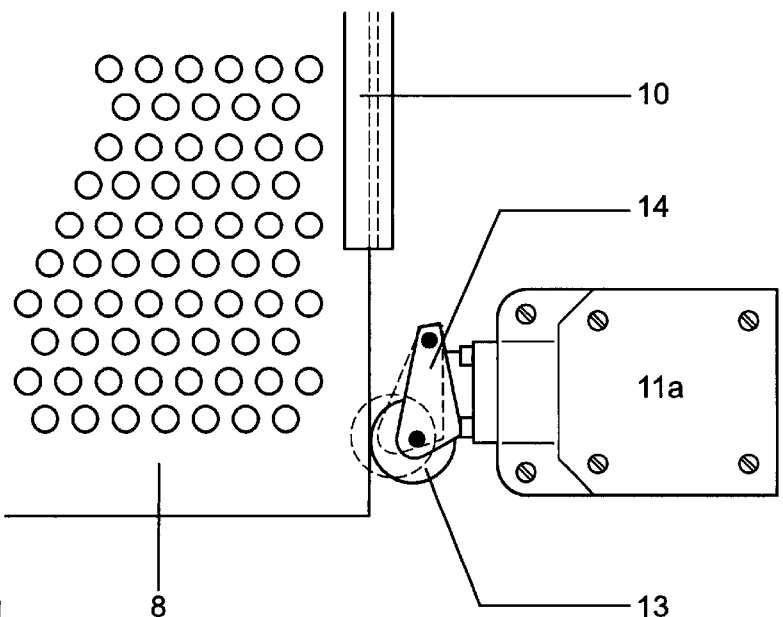
FIG. 4 is a detail of the protector device shown in plan.

The switches 11, 11a are mounted in series in the motor supply circuit 5 (FIG. 5) such that it suffices that one of the switches 11, 11a be opened by a small transverse movement of the grill 8 in one direction or the other such that the motor 5 stops, ensuring total safety to the personnel.

Figure 2:
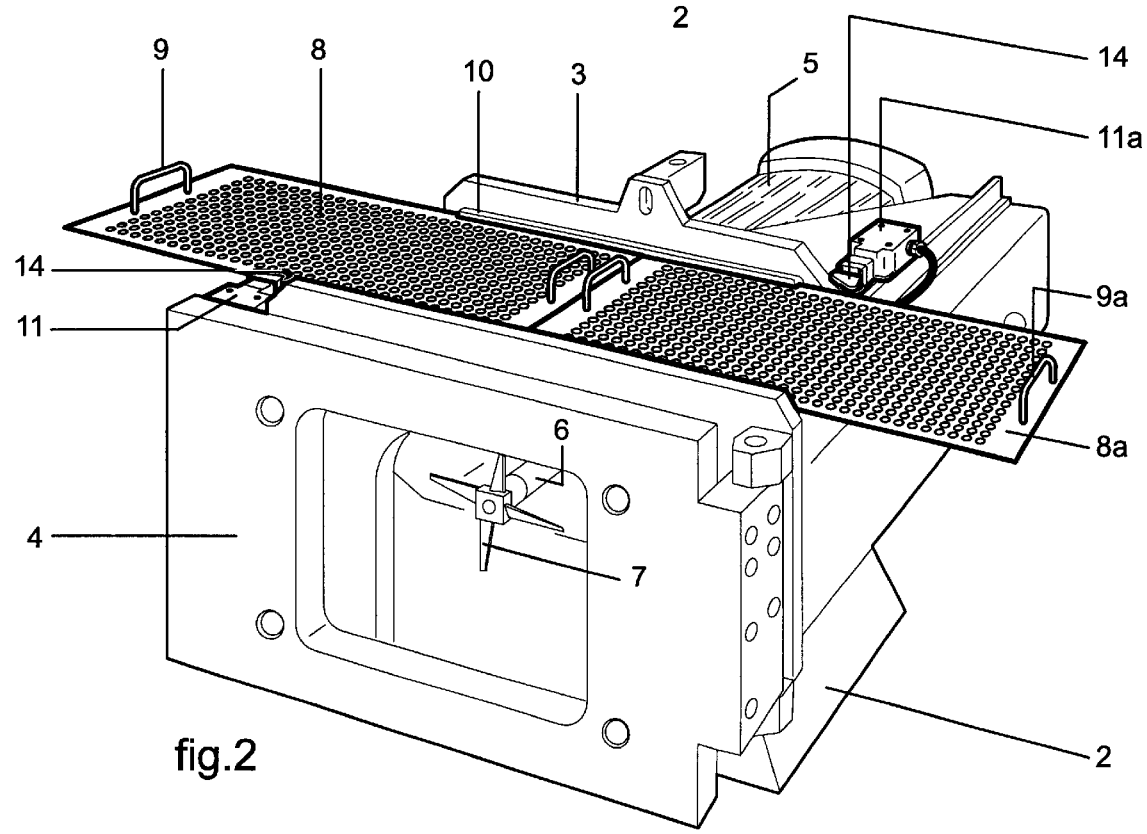
FIG. 2 is a view similar to FIG. 1 during the operation of replacing a dirtied protector element with a clean one without the machine needing to be stopped.
Figure 3:
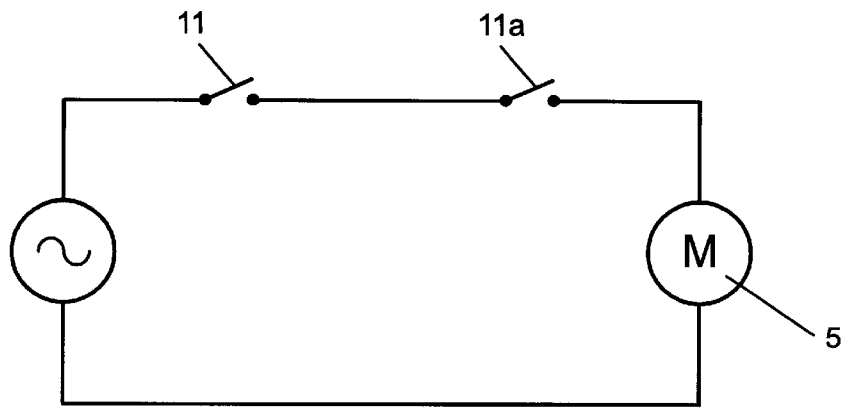
FIG. 3 is a simplified diagram of the electrical supply of the machine.

When the grill 8 is soiled and it is necessary to take it off to clean it, there is no need to stop the machine. Thus, as is seen in FIG. 2, it suffices to push sideways the grill 8 with the help of a second identical grill 8a. When changing the grill, the two switches 11 and 11a remain closed, one actuated by the grill 8 and the other by the grill 8a; then, when the grill 8a arrives in the active service position, it actuates the two switches 11 and 11a. The grill 8 is thus freed and can be cleaned.

Thanks to this protector device for machines comprising slideways 10, the switches 11 and 11a and the grills 8, 8a, it is possible to replace a protector grill 8 by a new protector grill 8a without stopping the machine and without any danger for the personnel.

To facilitate changing the grill 8, a support can be fixed to the housing 2 to receive the grill 8 when it is pushed off by the grill 8a.

In a modification, the switches 11, 11a can be mounted adjacent opposite ends of the same slide 10.

Of course, the protector device described and shown can be provided to close an opening or to protect a danger zone located in an oblique or vertical plane, as well as a horizontal plane as shown.

It is also evident that the machine to be protected can be of any type, it is only by way of example that the protector device has been described in relation to a granulator.

Moreover, the slides 10 are not necessarily continuous over all the length of the edges of the opening to be protected. Discontinuous sections of slideways can be provided, provided that it will not be possible to displace the grill 8 other than by straight line movement.

The closure of curved openings or surfaces can also be envisaged. In this case, the slides 10 match two opposite edges of the opening, and the grill 8 or protective element can be similarly shaped or even flexible to match the shape of the opening to be closed.

The protective elements can be imperforate, they can be transparent or translucent. These protective elements can be metallic or of rigid or flexible synthetic material.

Finally, it is evident that if the machine has several motors, these can all be supplied by means of the switches 11, 11*a* to obtain total stopping of the machine as soon as one of these is open.

What is claimed is:

1. A protector device for use in a machine having a housing, at least one motor, an electrical supply circuit for the motor, and a danger zone; the protector device comprising:

two parallel slides adapted to be disposed along two rectilinear sides of the danger zone;

two normally open switches, adapted to be connected in series in the electrical supply circuit; one of said switches being disposed adjacent one end of one of the slides while the other of said switches is disposed adjacent an opposite end of the slides;

two exchangeable protective elements adapted for sliding in said slides, and having a length such that in a service position, one protective element actuates control members of the two switches to close them, and during replacement of one protective element by the other, each of said protective elements closes one of the switches.

2. The protector device according to claim 1, wherein the slides and the switches are adapted to be fixed on the housing of the machine.

3. The protector device according to claim 1, wherein each protective element is a perforated metal element.

4. The protector device according to claim 1, wherein each protective element is rigid.

5. The protector device according to claim 1, wherein each protective element is flexible.

6. The protector device according to claim 1, wherein each switch comprises an actuating member disposed in prolongation of one slide and in the path of a side edge of the sliding protective element.

7. The protector device according to claim 1, wherein the switches are disposed adjacent opposite ends of the same slide.

8. The protector device according to claim 1, wherein one of the switches is disposed adjacent one end of one slide, and the other switch is disposed adjacent an opposite end of the other slide.

9. The protector device according to claim 1, wherein each protected element is structured to totally close the danger zone, when the protective element actuates the two switches simultaneously.

10. Apparatus comprising:

a machine having a housing; at least one motor; an electrical supply circuit for the motor; a danger zone; and a protector device for the danger zone; said protector device comprising two parallel slides adapted to be disposed along two rectilinear sides of the danger zone;

two normally open switches, adapted to be connected in series in the electrical supply circuit; one of said switches being disposed adjacent one end of one of the slides while the other of said switches is disposed adjacent an opposite end of the slides;

two exchangeable protective elements adapted for sliding in said slides, and having a length such that in a service position, one protective element actuates control members of the two switches to close them, and during replacement of one protective element by the other, each of said protective elements closes one of the switches.

11. The apparatus according to claim 10, wherein the slides and the switches are fixed on the housing of the machine.

12. The apparatus according to claim 10, wherein each protective element is a perforated metal element.

13. The apparatus according to claim 10, wherein each protective element is rigid.

14. The apparatus according to claim 10, wherein each protective element is flexible.

15. The apparatus according to claim 10, wherein each switch comprises an actuating member disposed in prolongation of one slide and in the path of a side edge of the sliding protective element.

16. The apparatus according to claim 10, wherein the switches are disposed adjacent opposite ends of the same slide.

17. The apparatus according to claim 10, wherein one of the switches is disposed adjacent one end of one slide, and the other switch is disposed adjacent an opposite end of the other slide.

18. The apparatus according to claim 10, wherein each protected element is structured to totally close the danger zone, when the protective element actuates the two switches simultaneously.

* * * * *